United States Patent
Palamara et al.

(10) Patent No.: US 11,208,982 B2
(45) Date of Patent: Dec. 28, 2021

(54) SYSTEM FOR GENERATING ELECTRIC ENERGY FROM WIND OR HYDRAULIC ENERGY

(71) Applicants: Rocco Palamara, Rome (IT); Piergiorgio Palamara, Rome (IT)

(72) Inventors: Rocco Palamara, Rome (IT); Piergiorgio Palamara, Rome (IT)

( * ) Notice: Subject to any disclaimer, the term of this patent is extended or adjusted under 35 U.S.C. 154(b) by 0 days.

(21) Appl. No.: 16/881,713

(22) Filed: May 22, 2020

(65) Prior Publication Data
US 2020/0370530 A1  Nov. 26, 2020

(30) Foreign Application Priority Data
May 24, 2019 (IT) .......................... 102019000004549

(51) Int. Cl.
*F03D 1/02* (2006.01)
*H02K 7/18* (2006.01)

(52) U.S. Cl.
CPC .............. *F03D 1/02* (2013.01); *H02K 7/183* (2013.01); *H02K 7/1823* (2013.01)

(58) Field of Classification Search
CPC ......... F03D 1/02; F03D 3/068; H02K 7/1823; H02K 7/183; H02K 7/116; F03B 17/067; F05B 2240/307; F05B 2210/16; F05B 2240/218; Y02E 10/72; Y02E 10/74
See application file for complete search history.

(56) References Cited

U.S. PATENT DOCUMENTS

2019/0360465 A1* 11/2019 Moore ...................... F03D 9/25

* cited by examiner

*Primary Examiner* — Joseph Ortega
(74) *Attorney, Agent, or Firm* — Nixon & Vanderhye

(57) ABSTRACT

A system for generating electric energy from wind or hydraulic energy includes a turbine, and an electric energy generating device to which the turbine is connected through a shaft along a first axis. The turbine includes at least one blade, configured to perform a first rotary movement with respect to the first axis, and a second rotary movement with respect to a second axis, coinciding with the axis of the blade itself. This provides a system with structural features allowing high efficiency, facilitating installation in various environmental contexts, without risk of damage for the respective operational and structural integrity, at the same time. Additionally, the system has an essentially reduced environmental impact, as well as a low noise level so that it can be installed in an urban context or in any case close to built-up areas, i.e. near houses or buildings.

14 Claims, 10 Drawing Sheets

SYSTEM FOR GENERATING ELECTRIC ENERGY FROM WIND OR HYDRAULIC ENERGY

TECHNICAL FIELD

The present invention relates to a system for generating electric energy from wind or hydraulic energy.

BACKGROUND ART

It is known that one of the most currently felt problems is that of generating electric energy in a more environmentally sustainable manner, e.g. by using energy from a fluid such as air or water.

For this purpose, various types of wind turbines or hydro-generators are known, which have various types of disadvantages even if they are technically efficient.

In particular, wind turbines, mostly of large size, with three blades and horizontal axis, are known. Said wind turbines, even if they are being efficient are nevertheless exposed to significant structural strains, which makes it necessary to provide for special pylons that require deep foundations, with the resulting high impact on the territory. Additionally, said known wind turbines also have a considerable visual impact, as well as a high noise level, which allows installing them only in sites far from built-up areas or the like. On the other hand, given their considerable extension in height, said wind turbines are also unsuitable for installation on floating platforms in the open sea, where they would inevitably have problems in terms of poor stability.

Small or medium-sized plants, usually having a vertical axis, are also known, which, while allowing to overcome the aforesaid problems related to a significant development in height, have many technical and functional problems, which are still unresolved.

Technical Problem

In light of the above, the present invention intends to provide a system for generating electric energy from wind or hydraulic energy which solves the aforesaid disadvantages of the prior art.

In particular, it is the purpose of the present invention to provide a system as specified above, which has structural features which allow obtaining a high level of efficiency, while allowing the installation thereof in various environmental contexts, without risk of damage for the respective operational and structural integrity, at the same time.

It is a further purpose of the present invention to provide a system as said, which has an essentially reduced environmental impact, as well as a low noise level so that it can be installed in an urban context or in any case close to built-up areas, i.e. near houses or buildings.

Solution to the Problem

These and other purposes have been achieved, according to the present invention, by providing a system for generating electric energy from wind or hydraulic energy, according to claim 1.

Further advantageous features of the invention are comprised in the dependent claims.

BRIEF DESCRIPTION OF THE DRAWINGS

The features and advantages of the present invention will become more apparent from the detailed description of an exemplary embodiment of the invention, provided below and referring to the accompanying drawings, in which:

FIG. 6/1 is a diagrammatic, perspective, and detailed view of a further variant of the blade, in which said overhangingly projecting portion projects from a proximal end of the blade itself;

FIG. 6/2 is a diagrammatic, perspective, and detailed view of another variant of the blade, in which said blade comprises two overhangingly projecting portions, one projecting from a distal end of the blade, and the other from a proximal end of the blade;

FIG. 12/1 is a diagrammatic, perspective, and detailed view of a variant of the system in FIG. 12;

FIG. 21/1 is a diagrammatic, perspective, and detailed view of a variant of the system in FIG. 1, in which the blades are tilting with respect to a central body;

FIG. 27/1 is a diagrammatic, perspective, and detailed view of an adjustable positioning device, to be implemented with reference to the positioning member in FIG. 27;

DETAILED DESCRIPTION OF THE INVENTION

The present invention relates to a system for generating electric energy from wind or hydraulic energy, which includes:

wind or hydraulic turbine means A03; A04; 22Y; 101; 120; 30A; 30Y; 40A; 50A; 60A; 60B; 60A2; 70A; A81, A91; 31B; 360; 370; 380, and an electric energy generating device 103, operatively connected to said turbine means A03; A04; 22Y; 101; 120; 30A; 30Y; 40A; 50A; 60A; 60B; 60A2; 70A; A81, A91; 31B; 360; 370; 380, for transforming wind or hydraulic energy into electric energy, where said turbine means A03; A04; 22Y; 101; 120; 30A; 30Y; 40A; 50A; 60A; 60B; 60A2; 70A; A81, A91; 31B; 360; 370; 380 are rotatably mounted with respect to said generating device 103, through a rotation shaft 3, 4, about a first axis B-B of said generating device 103, where said turbine means A03; A04; 22Y; 101; 120; 30A; 30Y; 40A; 50A; 60A; 60B; 60A2; 70A; A81, A91; 31B; 360; 370; 380 comprise at least one blade 2, 2'; 30, configured to perform a first rotary movement with respect to said first axis B-B, and a second rotary movement with respect to a second axis A-A, coinciding with the axis of the blade 2, 2'; 30 itself, where said second rotary movement cooperates, in a first hemicycle of rotation of said turbine means A03; A04; 22Y; 101; 120; 30A; 30Y; 40A; 50A; 60A; 60B; 60A2; 70A; A81, A91; 31B; 360; 370; 380 with respect to said generating device 103, upon the achievement of a first orientation position of the blade 2, 2'; 30, in which the blade 2, 2'; 30 is oriented with a face 60 thereof (i.e. a frontal face opposite to a dorsal face 70) so as to oppose an air or water flow VU (FIG. 2) determining the rotation of said turbine means A03; A04; 22Y; 101; 120; 30A; 30Y; 40A; 50A; 60A; 60B; 60A2; 70A; A81, A91; 31B; 360; 370; 380 with respect to said generating device 103, so as to offer a maximum exposure surface with respect to the flow VU and to optimize the rotary thrust, respectively, upon the achievement of a second orientation position of the blade 2, 2'; 30, in a second hemicycle of rotation of said turbine means A03; A04; 22Y; 101; 120; 30A; 30Y; 40A; 50A; 60A; 60B; 60A2; 70A; A81, A91; 31B; 360; 370; 380 with respect to said generating device 103, in which an upper edge 7 of said blade 2, 2'; 30, configured to cleave an air or water flow, is oriented opposite to a reverse air or water return flow VC (FIG. 2), so as to minimize the surface of the blade (2, 2'; 30) exposed to said return flow VC.

Advantageously, each blade 2, 2'; 30 comprises at least one portion 11, 11' overhangingly projecting from a distal end 10 (FIGS. 2-3, 12, 17, 20 to 24, 26 and 28) or proximal end 9 (FIG. 6/1) of the blade 2, 2'; 30 to intercept an air or water flow VE (FIGS. 3, 6/1 and 6/2) in a condition in which, at the end of each rotary hemicycle of said turbine means A03; A04; 22Y; 101; 120; 30A; 30Y; 40A; 50A; 60A; 60B; 60A2; 70A; A81, A91; 31B; 360; 370; 380 with respect to said generating device 103, the blade 2, 2'; 30 is arranged according to an orientation parallel to said air or water flow VU, and therefore unable to oppose said flow VU with the face 60 thereof.

In particular, said end portion 11, 11' is configured to receive a thrust from the bottom upwards to determine the passage from said first orientation position of the blade 2, 2'; 30 to said second orientation position of the blade (2, 2'; 30), and respectively to receive a thrust from the top downwards to determine the passage from said second orientation position of the blade (2, 2'; 30) to said first orientation position of the blade (2, 2'; 30).

In a variant, each blade 2, 2' may include a first portion 11 overhangingly projecting from said distal end 10 of the blade 2, 2'; 30, and a second portion overhangingly projecting from said proximal end 9 of the blade 2, 2'; 30 (FIG. 6/2).

Advantageously, said projecting portion 11, 11' may be pivotally connected to said distal 10, respectively proximal 9, end of the blade 2, 2'; 30 through hinged connecting means 12'.

Figures 3, 5, 6:
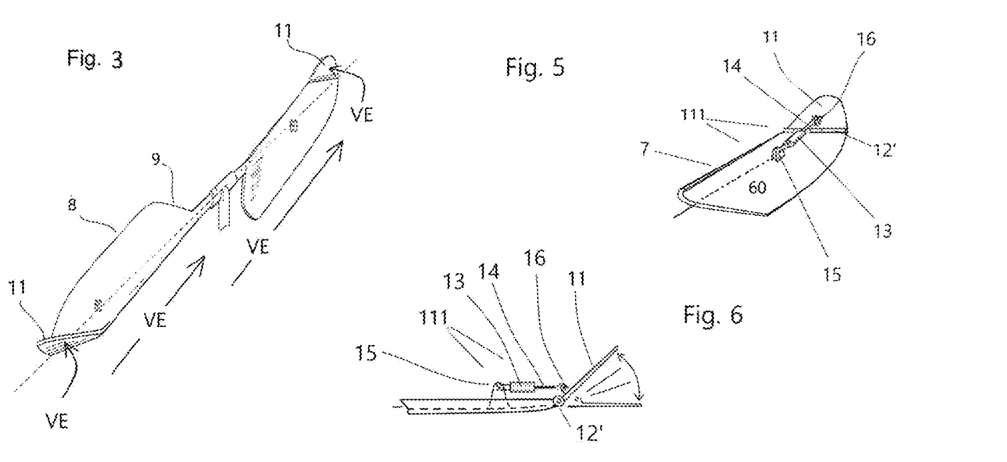
FIGS. 5-6 are diagrammatic detailed views, illustrating a variant of the blade construction, in which said overhangingly projecting portion comprises automatic adjustment means.

On the other hand, the inclination of said portion 11, 11' with respect to said distal 10, respectively proximal 9, end, of the blade 2, 2'; 30 can be conveniently adjusted through automatic adjustment tools 111 (FIGS. 5-6). For this purpose, the blade may be implemented with a long-shaft moving member (e.g. an electric motor 13) incorporating a threaded shaft 14 adapted to be lengthened and shortened by rotary action thereof and connected, at an end thereof, with respect to a joint 15 fixed close to said hinged connecting means 12', and at the other end with respect to an articulated retainer 16 placed on the body of said portion 11, 11'. In this case, when the electric motor 13 rotatably calls the threaded shaft 14 towards itself, said portion 11, 11' folds inwards increasing the angular incidence with respect to the surface 60, while, when said threaded shaft 14 is released (thus determining an elongation thereof) said portion 11, 11' extends progressively to a position of coplanarity with respect to the surface 60.

Said turbine means may have a pair of blades 2, 2' having the same shape and axially mutually aligned.

Figure 12:
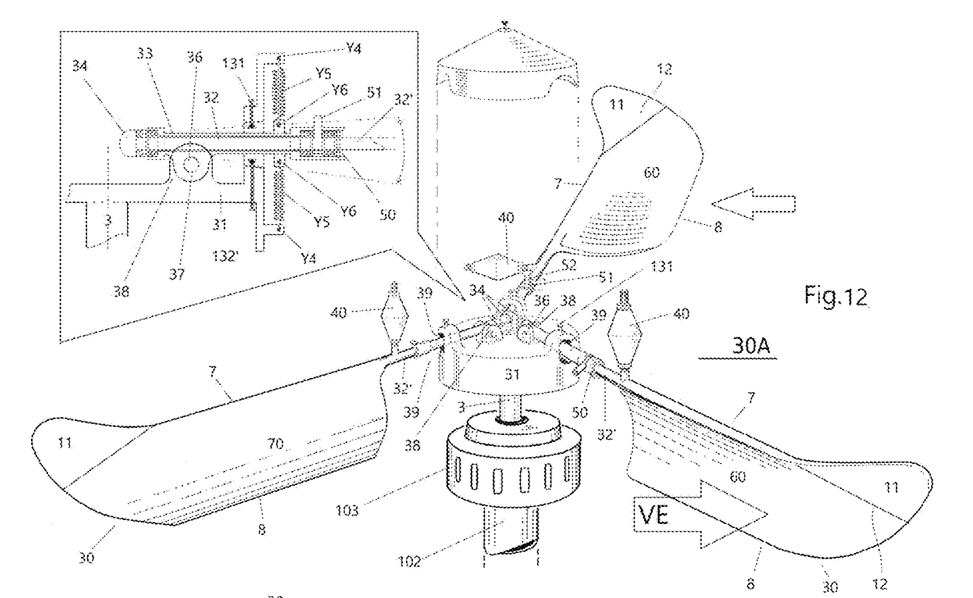
FIG. 12 is a diagrammatic, perspective view of a system for generating electric energy from wind or hydraulic energy according to a second example embodiment of the invention, in which turbine means have three blades equally spaced apart and in a radial pattern, said blades being tilting with respect to a central body.

As a variant, said turbine means may have blades 30 in a number greater or equal to three, arranged equally spaced apart in a radial pattern (e.g. as shown in FIG. 12).

Figures 4, 7, 8, 9:
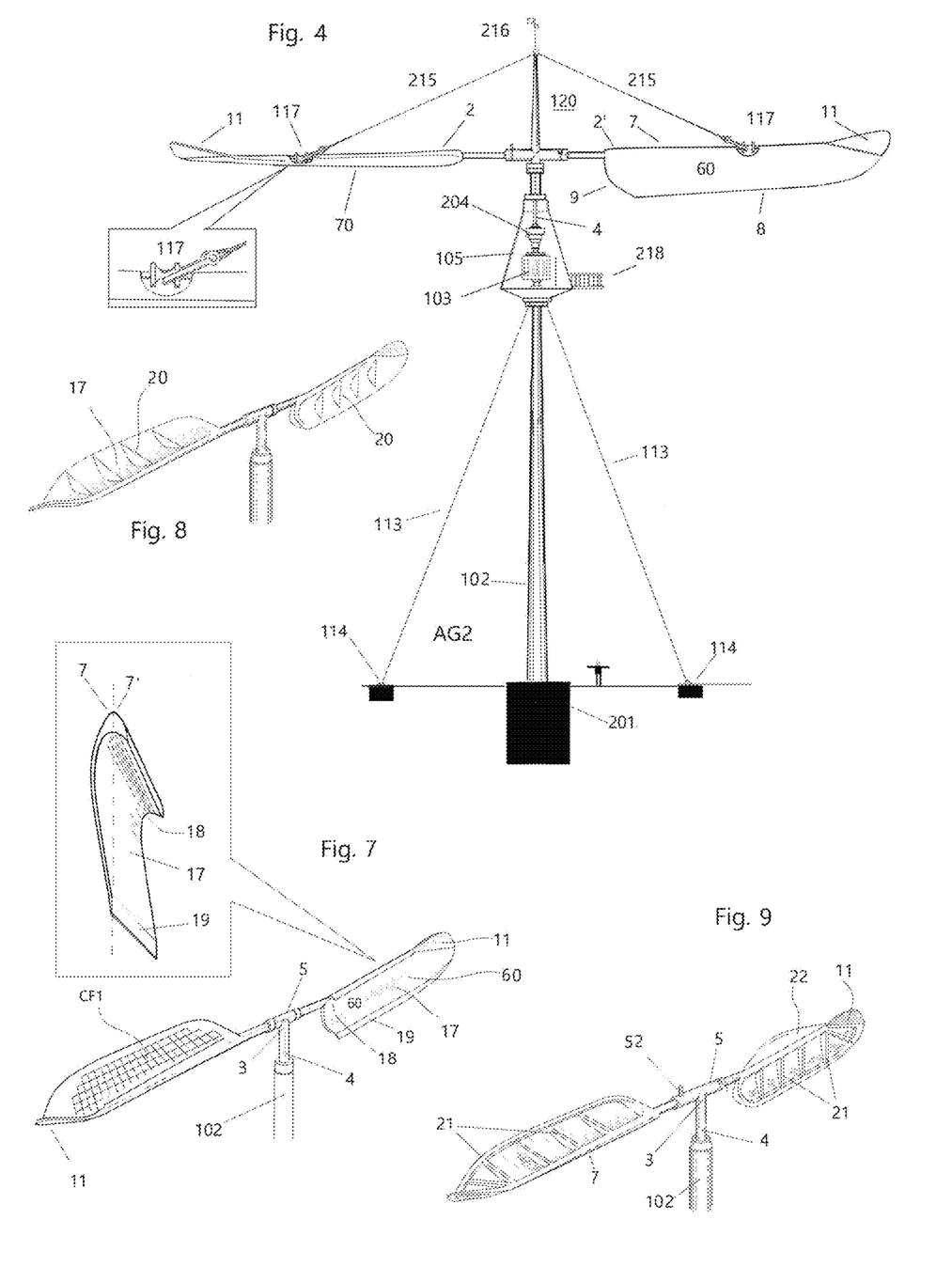
FIG. 4 is a front elevation view of a system similar to that in FIG. 1, but larger in size, installed with respect to a concrete base.
FIGS. 7-11 are diagrammatic views illustrating the respective blade shape variants.
Figure 6:
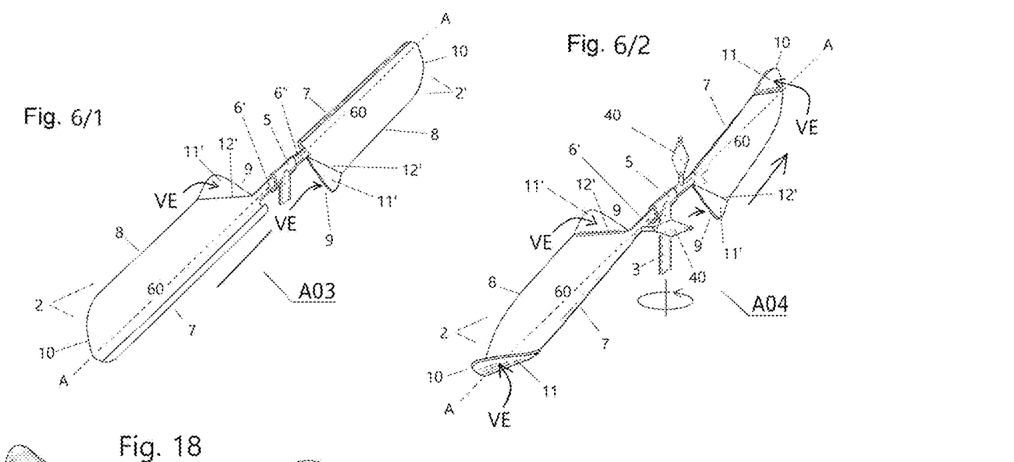

Advantageously, said face 60 of said at least one blade 2, 2'; 30 may have a recess 17 with accentuated concavity 18 close to the upper edge 7, to maximize the exposed surface with respect to said air or water flow VU thereby determining the rotation of said turbine means. Said recess 17 may further have a plurality of fins 20, which project from said face 60, in a direction perpendicular thereto (FIG. 8). Furthermore, the upper edge 7 may have a fold 19.

According to a further variant, said face 60 may comprise a supporting frame 21, and a flexible membrane (22) (e.g. made of nylon, rubberized cloth or the like), configured to determine a sail effect when exposed to said air or water flow VU determining the rotation of said turbine means (FIG. 9).

Advantageously, in a preferred configuration, a proximal tubular portion 6', 6", 32; 32'; 45 of said at least one blade 2, 2'; 30 is arranged in a corresponding housing of a support element 5; 33, in which said support element 5; 33 comprises the first oscillating connecting means having a projecting portion Y12, 37, having a through-hole Y12' for the insertion of a pin 36; 69; Y10; PO5 in a direction orthogonal with respect to said first axis B-B. A central seat 46; 31; Y11; 92, vertically projecting with respect to a upper end of said rotating shaft 3, 4 has second oscillating connecting means, configured to engage said first oscillating connecting means, said second oscillating connecting means having two mutually parallel walls Y11"; 38 and each having a respective through-hole, aligned with respect to said through-hole of said projecting portion Y12, 37, for the insertion of said pin 36; 69; Y10; PO5 (e.g. see FIGS. 12 and 21/1). Thereby, a tilting movement of said at least one blade 2, 2'; 30 may be performed according to an air or water flow which skims it, once the connection between said first, respectively second, oscillating connecting means is established through the insertion of said pin 36; 69; Y10; PO5 in said mutually aligned through-holes.

Figures 26, 27:
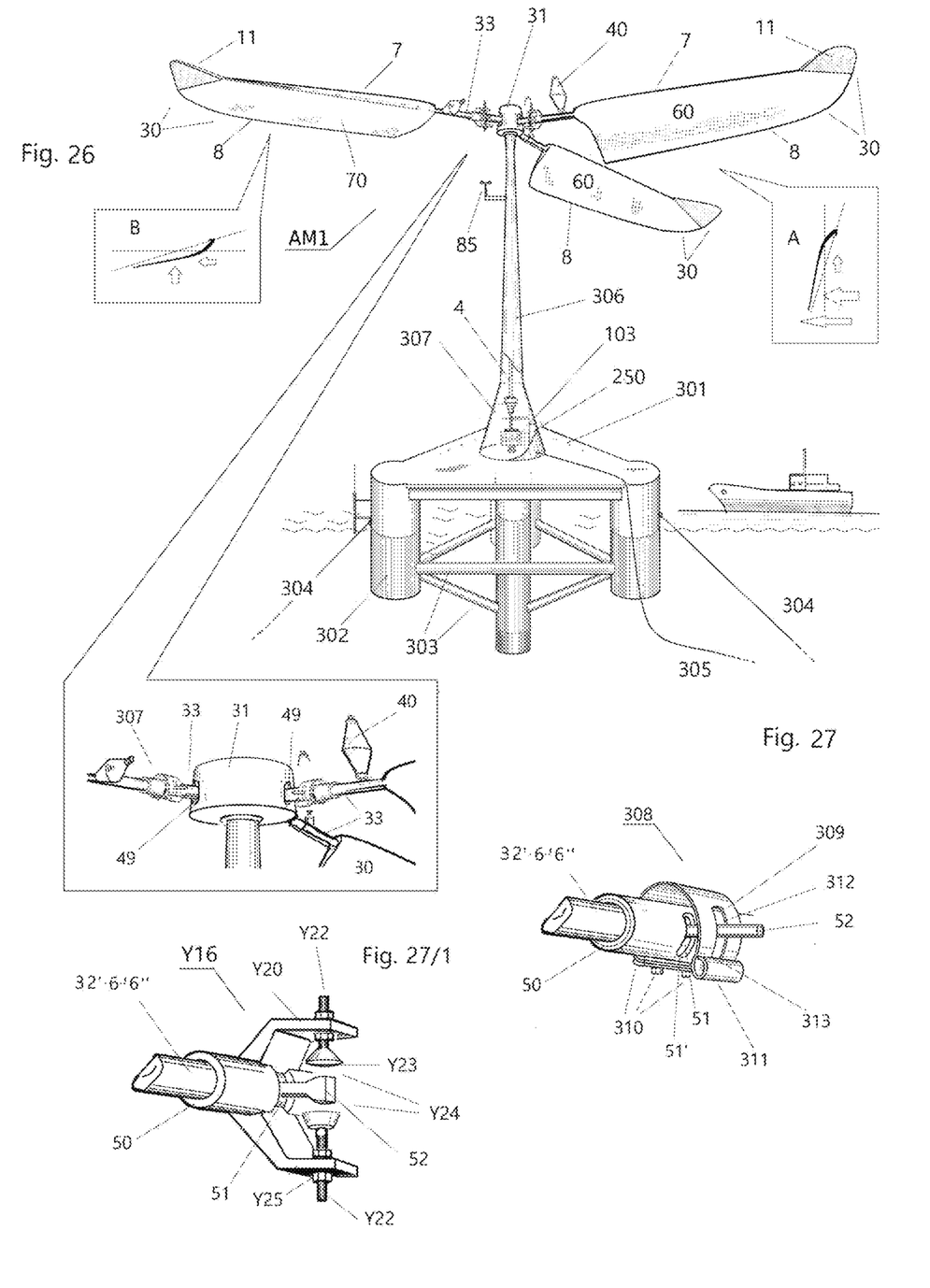
FIG. 26 is a variant of the system in FIG. 12, installed with respect to a floating platform.
FIG. 27 is a diagrammatic, perspective, and detailed view of a positioning member for maintaining the correct positioning of a blade with respect to the axis thereof in a first, respectively second, orientation position.

Furthermore, a positioning member 55, 308 may be provided for maintaining the correct positioning of the blade 2, 2'; 30 with respect to the axis thereof in said first, respectively second, orientation position, said positioning member comprising a slot 51, configured for the engagement with a pin 52, 52' projecting from said proximal tubular portion 6', 6", 32; 32'; 45 of the blade 2, 2'; 30, and which configures abutment stop means to delimit the rotary movement of the blade 2, 2'; 30 with respect to said second axis A-A (FIG. 27).

Said positioning member 308 may further include elastic means 309 to allow the adjustment of the inclination of said at least one blade 2, 2'; 30 according to the flow rate of said air or water flow VU thus determining the rotation of said turbine means (FIG. 27).

In particular, said elastic means 309 (e.g. spring-loaded) are fixed at one end 311 to a tubular support 310. Between a lower limit stop 51' of the slot 51 and an abutment element 313 of said elastic means 309 there is a turn diverter, so that, when the blade is positioned along an essentially vertical direction, the pin 52 is attested with respect to said abutment element 313 for the reached vertical positioning of the blade, in the slot 51 there is still room for maneuver, which remains unused as long as the force applied by the wind remains within a predefined value while, when said predetermined value is exceeded, the blade will tend to rotate about the axis thereof, thereby applying pressure on the pin 52, which—in turn—will apply pressure on said elastic means 309.

To promote the keeping of a balance condition and to promote the passage of said blade 2, 2'; 30 from said first orientation position to said second orientation position and vice versa, counterweight means 71, Y1, 40, 40', 41 may be provided connected to said proximal tubular portion 6', 6". 32; 32'; 45, respectively with respect to said upper edge 7, of the blade 2, 2'; 30. Said counterweight means 71, Y1, 40, 40', 41 extend in the opposite direction to a lower edge 8 of the blade 2, 2'; 30.

Figure 1:
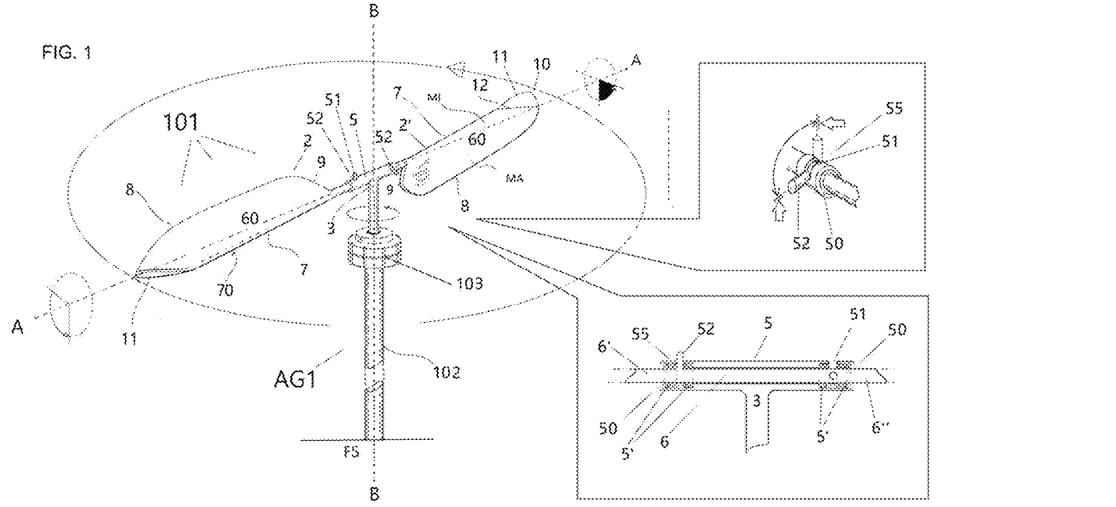
FIG. 1 is a diagrammatic, perspective view of a system for generating electric energy from wind or hydraulic energy according to a first example embodiment of the invention, in which turbine means have a pair of blades axially aligned with each other.
Figure 2:
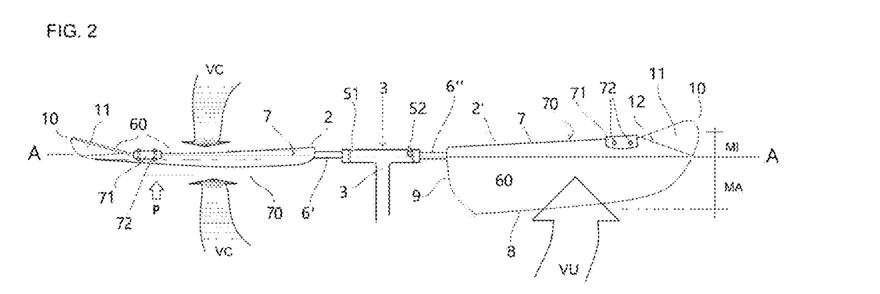
FIGS. 2-3 are detailed views related to the operation of said pair of blades when they are subjected to the stress of different air or water flows, said blades each comprising a projecting portion overhanging from a distal end thereof.

FIGS. from 1 to 3 illustrate a system according to a first embodiment of the present invention. Said system is illustrated, by way of example, as a small-sized wind turbine AG1, including turbine means 101 located in a top zone of a supporting member, such as a mast 120, fixed to a base FS. The generating device 103 is provided on the same mast 120, in the lower position with respect to said turbine means 101.

A transmission shaft 3, 4 connects said turbine means operatively and directly to said generating device 103.

In the present embodiment, said support element 5 comprises a tubular body open at the ends 50, 50', to define a pair of housings each for a proximal tubular portion 6, 6' of a respective portion of said axially and mutually aligned blades 2, 2.

Advantageously, in the turbine 22Y according to the variant shows in FIG. 21/1, said first oscillating connecting means comprise said projecting portion Y12 projecting from the top of said support element 5, and said second oscillating connecting means comprise a central body Y11' having a pair of open ends Y11" and said two walls Y11", which extend parallel to said projecting portion Y12, projecting from the top, of said first oscillating connecting means.

The aforesaid configuration allows a tilting movement of said pair of blades 2, 2' axially aligned with respect to said pin Y10, depending on an air or water flow which skims them.

The tilting movement of the 2, 2' is further promoted by the presence of a pair of helical spring means Y13 connected, at one end, with respect to first connecting elements Y15 provided in said drive shaft 3, 4, and at the other end to the second connecting elements Z14 provided in said support element 5 (FIG. 21/1)

It is worth noting that, during operation, one of the blades 2, 2' (on the right in FIG. 1) has the face 60 thereof perpendicularly to the flow (in this case, of air) VU, thus offering a maximum exposure surface with respect to the VU flow, and consequently optimizing the rotary thrust (rightwards in FIG. 1). On the other hand, the other one of said blades 2, 2' (on the left in FIG. 1) is arranged substantially edgewise, exposing the upper edge 7 thereof with respect to the return flow (in this case, of air) VC, thus minimizing the surface of the blade 2, 2' which opposes said return flow VC.

Therefore, the present invention allows taking full advantage in terms of rotary thrust of the flow VU, while minimizing the impact of reverse return flow VC.

In the present embodiment, said counterweight means Y1 are configured in the form of sleeves 71 fixed with bolts 72 with respect to the upper edge 7 of each blade 2, 2' (FIG. 2).

FIG. 4 diagrammatically shows a system comprising a wind turbine AG2 similar to the wind turbine AG1 in FIG. 1, but of medium/large size. In this case, the mast 102 consists of a steel column or pylon, permanently fixed to a concrete base 201.

Turbine means 120 of the wind turbine AG2 have similar structural characteristics to the turbine means of the wind turbine AG1, from which they differ—substantially—in size.

A container body 105 for containing means necessary for generating electric energy (such as the generating device 103) is placed on said mast 102. The system in FIG. 4 may further include a multiplier 204 of the kinetic energy collected by the blades 2, 2'.

The system may further include: a braking system 110, position lights 212, an anemometer 213, a hydraulic unit for a cooling system, and an electrical and control unit.

On the other hand, said system is provided with transverse support rods 113 (e.g. steel cables/steel ropes or the like) fixed, at one end, with respect to said mast 102, and at the other end to anchorings 114 fixed to the ground. Supporting tie-rods 215 (e.g. steel cables/bars or the like) extend to an anchoring element 216, provided in a top zone of said mast 102, and fixing means 217, provided on said upper edge 7 of each blade 2, 2' (FIG. 4), thereby providing better support for the blades themselves.

The system may also include a support deck 218 for maintenance purposes.

It is worth noting that, when compared with known large wind turbine systems, the wind turbine system AG2 has a significantly improved and simplified structure, the performance being the same.

According to an example of embodiment, at least one of the blades 2, 2' may have a plurality of photovoltaic cells CF1 on at least one surface.

Figure 10:
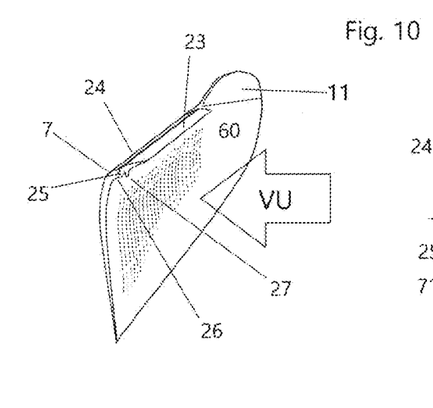
Figure 11:
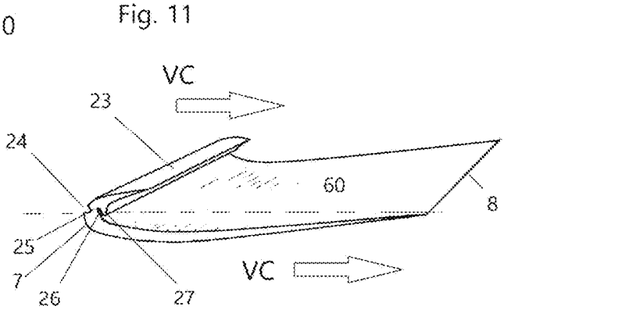

In the variant shown in FIGS. 10-11, the blade has an additional tilting element 23, fixed in an oscillating manner with respect to said upper edge 7 through flexible connecting means 25, i.e. configured in the form of a hinge, aimed at extending the interception surface of a fluid flow to which the blade is exposed. The upper edge 7 has a groove 24 to promote the oscillation of the element 23. An additional recess 26, working as a compressible space, is formed under the upper edge 7, while a supporting relief 27, working as an abutment element, extends along a lower edge of the element 23.

FIG. 12 shows a system for generating electric energy from wind or hydraulic energy according to a second embodiment of the present invention. Said system has similar characteristics with respect to the system described above with reference to the first embodiment, from which it differs in that said turbine means 30A have blades 30 in number equal to or greater than three, equally spaced apart and arranged in a radial pattern (see also FIG. 12/1).

Advantageously, in the configuration shown in FIG. 12, said support element 33 has a tubular body having a first open end, distal in situ, for inserting a respective proximal tubular portion 32 of a blade 30, and a second closed end, proximal in situ. Said first oscillating connecting means comprise said projecting portion 37, projecting on the bottom from said support element 33, and said second oscillating connecting means comprise said two walls 38, which extend parallel to said projecting portion 32, projecting on the bottom, of said first oscillating connecting means.

Thereby, it is possible to allow a tilting movement of said blades 30 according to an air or water flow skimming them.

FIG. 12/1 shows a simplified variant of the configuration shown in FIG. 12, in which said tilting movement of the blades 30 of the turbine means 30Y is missing. Said central seat may further have a plurality of openings 39 for the passage of a respective support element 33, and in which said support element 33 is supported in an oscillating manner through elastic means Y5 provided in each of said openings 39 and connected in situ with respect to said support element 33.

Said openings 39 may further comprise threaded adjustment means 131, 131' for defining and adjusting the maximum oscillation amplitude of each blade 30.

Specifically, said threaded adjustment means 131, 131' can be screwed/unscrewed with respect to complementary threadings 132, 132', to allow the easy definition and adjustment of the maximum oscillation amplitude of each blade 30 (FIG. 27/1).

Elastic applications can be provided to assist the support of the blade 30 in a mediated suspension. For example, a pair of extensions Y4 can be provided ascending and descending from the central body 31 at said mouths 39, for retaining a respective spring Y5, in turn, connected to a corresponding seat Y6.

In the present embodiment, said counterweight means are configured in the form of elements with a threaded shank for the relative connection to the blade, with the possibility of adjustment to achieve the best balance.

Alternatively, such counterweight means may comprise compensating springs.

Figures 12, 13, 14:
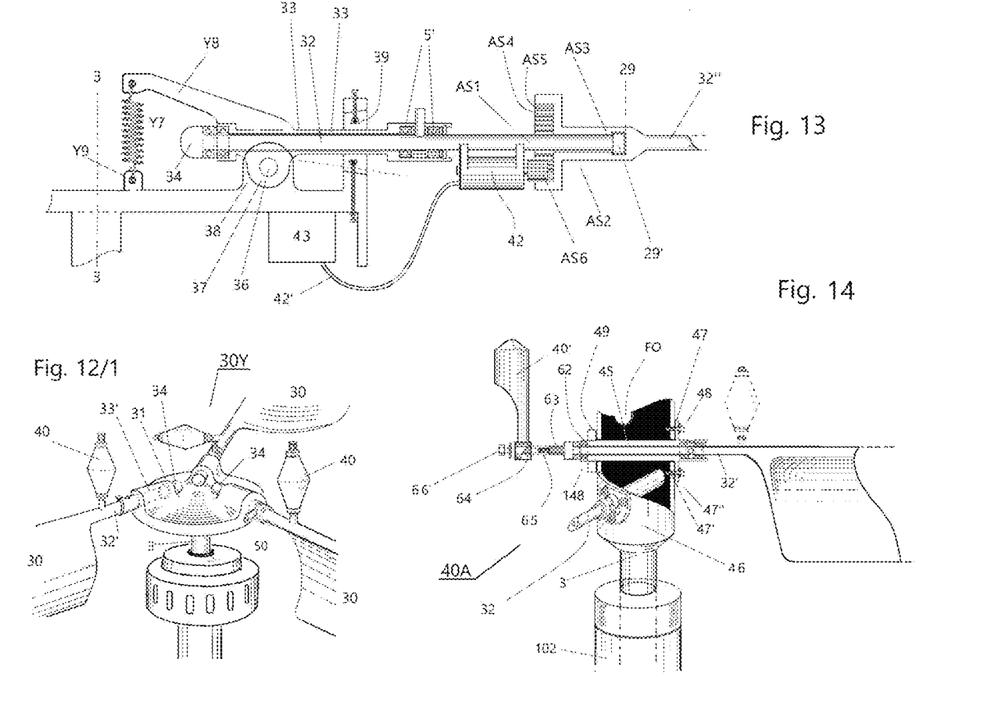
FIG. 13 is a diagrammatic, front elevation and partial section view of a variant of the system in FIG. 12, having a mechanized blade positioning mechanism.
FIGS. 14-16 are diagrammatic, perspective, detailed and partial views of variants of the system in FIG. 12, including a column turbine.

FIG. 13 shows a variant, which also is implementable with reference to the first embodiment described above, comprising an assisted positioning device 41 implemented with reference to each blade 2, 2'; 3 to be able to adjust the inclination of the blade with respect to the axis thereof remotely (e.g. from a computerized service unit in the system). Thereby, it is thus possible to achieve, especially with reference to large systems, a preferred orientation of the blade in relation to the air or water flow during its operation, i.e. to determine a pause condition in which each blade is oriented to oppose the minimum surface (i.e., the upper edge 7 thereof) with respect to the flow, in case of wind or particularly strong currents which could affect the structural integrity of the blade itself. The tubular proximal portion 6', 6''. 32; 32'; 45 of the blade 2, 2'; 30 has a detachment point 29, and is divided into two axial bodies, AS1, AS2, inner and outer respectively, in which the inner axial body AS ends at a proximal end with a circular thickening 29', housed and retained by the head in a complementary seat AS3 of the axial body AS2 to avoid the unintentional separation between said axial bodies AS1, AS2. The outer body AS2 also features an expanded mouth AS4 with a ring gear AS5 inside, engaged with a complementary toothed element AS6 operatively connected to an electric motor 42. Said electric motor 42 is connected to a peripheral control unit 43 by means of a special electric cable 42'.

An elastic support Y7 (e.g. a helical spring or an elastic) is connected, at one end, with respect to an arm Y8 projecting from said supporting means 33, and at the other end with respect to a coupling point Y9, extending from said drive shaft 3, 4. The elastic support Y7 cooperates with the counter-balancing of the blade weights.

In the variant in FIG. 14, each blade 30 is housed in supporting means 45, similar to the supporting means 33, from which it differs in that it is equipped with its own fixing means, which allows it to be directly connected to a structural element 46, such as a vertical shaft, of the column type or the like, having—in the illustrated variant—through-holes FO adapted to accommodate respective supporting means 45, accommodating a respective proximal tubular portion 32' of a blade.

Said supporting means 45 can be fixed to said structural element 46.

Alternatively, said fixing is achievable by means of modular connecting means comprising a fixing plate 47 having at least one through-hole 47', as well as corresponding threadings 47" formed on said structural element 46, which allow reciprocal fixing by bolting 48.

Said fixing means further comprise a rear engagement 148 and a threaded ring 49, for the engagement with a complementary threading 62, cooperating in the stability of the fixing between said supporting means 45 and said structural element 46.

Rear counterweight means 40' are connected to said proximal tubular portion of the blade, close to the retaining head 34, and extend in a direction substantially perpendicular with respect to the lower edge 8 of the blade. Specifically, said counterweight 40' comprises a grooved cavity 64, for the coupling with respect to a grooved element 63 of said proximal tubular portion of the blade, complementary thereto. The fixing is further stabilized by engaging by screwing between a threaded portion 65, provided at a distal end of said proximal tubular portion of the blade, and a threaded nut 66.

Figures 15, 16, 17:
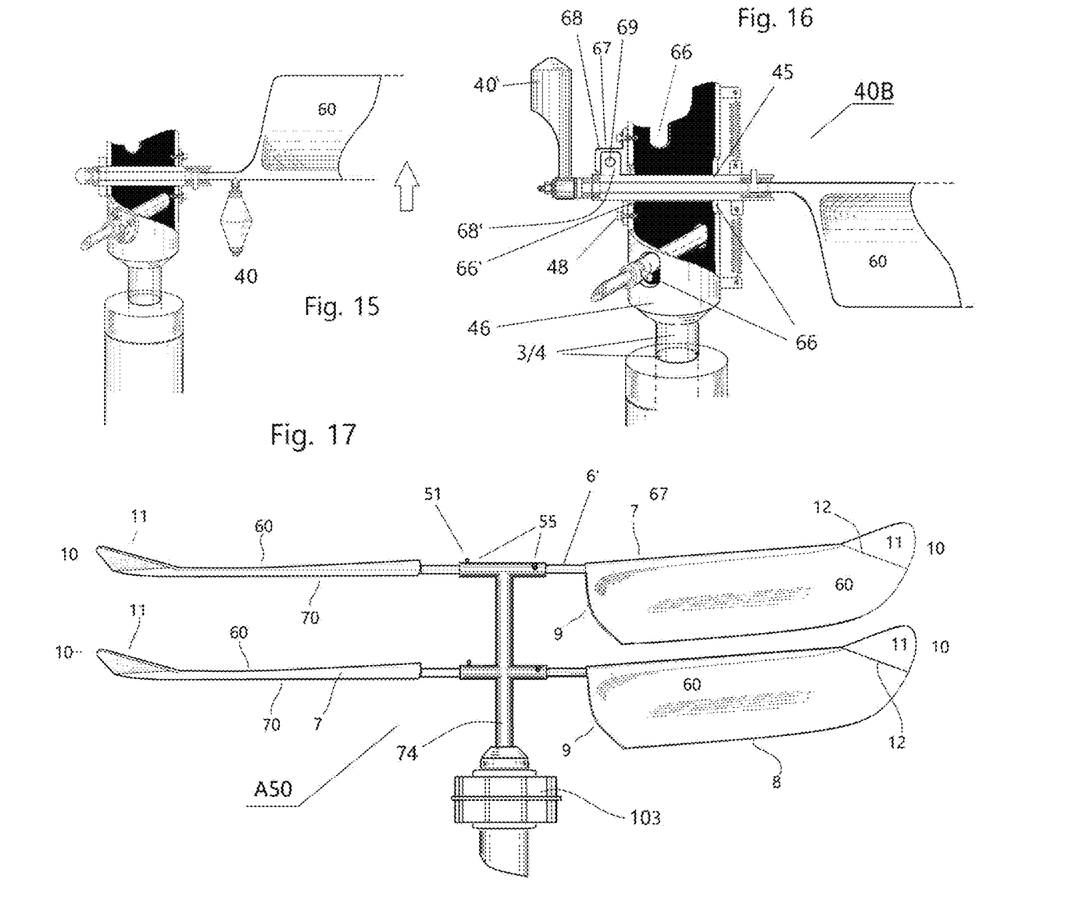
FIG. 17 is a diagrammatic, perspective view of a system for generating electric energy from wind or hydraulic energy according to a third example of embodiment of the invention, in which turbine means have multiple arrays of axially aligned, mutually superimposed blades.

FIG. 16 shows a further alternative fixing between said supporting means 45 and said structural element 46, such to allow a tilting movement of said supporting means 45 (and, therefore, of the blades themselves). For this purpose, said structural element 46 has a plurality of windows 66, 66' configured in the form of vertically elongated openings, which allow a tilting movement of the support element 45 housed therein. In particular, said support element 45 has a pair of parallel protrusions 68 with their respective through-holes aligned, while said structural element 46 comprises connecting means 67 having a protrusion 68 with a through-hole aligned in situ with said through-holes of the protrusions 68', said through-holes aligned with each other being configured for the passage of orthogonal pin 69.

FIG. 17 shows a system for generating electric energy from wind or hydraulic energy according to a third embodiment of the present invention.

It is worth noting that said system has very similar structural characteristics to those described above with reference to the previous embodiments, from which it differs only by a different arrangement of the blades.

In particular, in said system, said turbine means 50A, 60A comprise several arrays of blades 2, 2'; 30 mutually superimposed and aligned (FIG. 17) or staggered (FIG. 18), according to planes either vertically (FIG. 17) or horizontally (FIG. 20) mutually aligned.

Thereby, especially within a large system, it is possible to speed up the transition from said first orientation position to said second orientation position, and vice versa.

In the aforesaid figures, the illustrated blades have the same size. However, in a further variant, said turbine means 60B comprise a first pair 76 of blades, having the same first dimension and axially aligned in a first direction, and a second pair 76P of blades, having a second dimension, smaller than said first dimension, and axially mutually aligned in a second direction, perpendicular to said first direction (FIG. 19).

Figures 18, 19, 22:
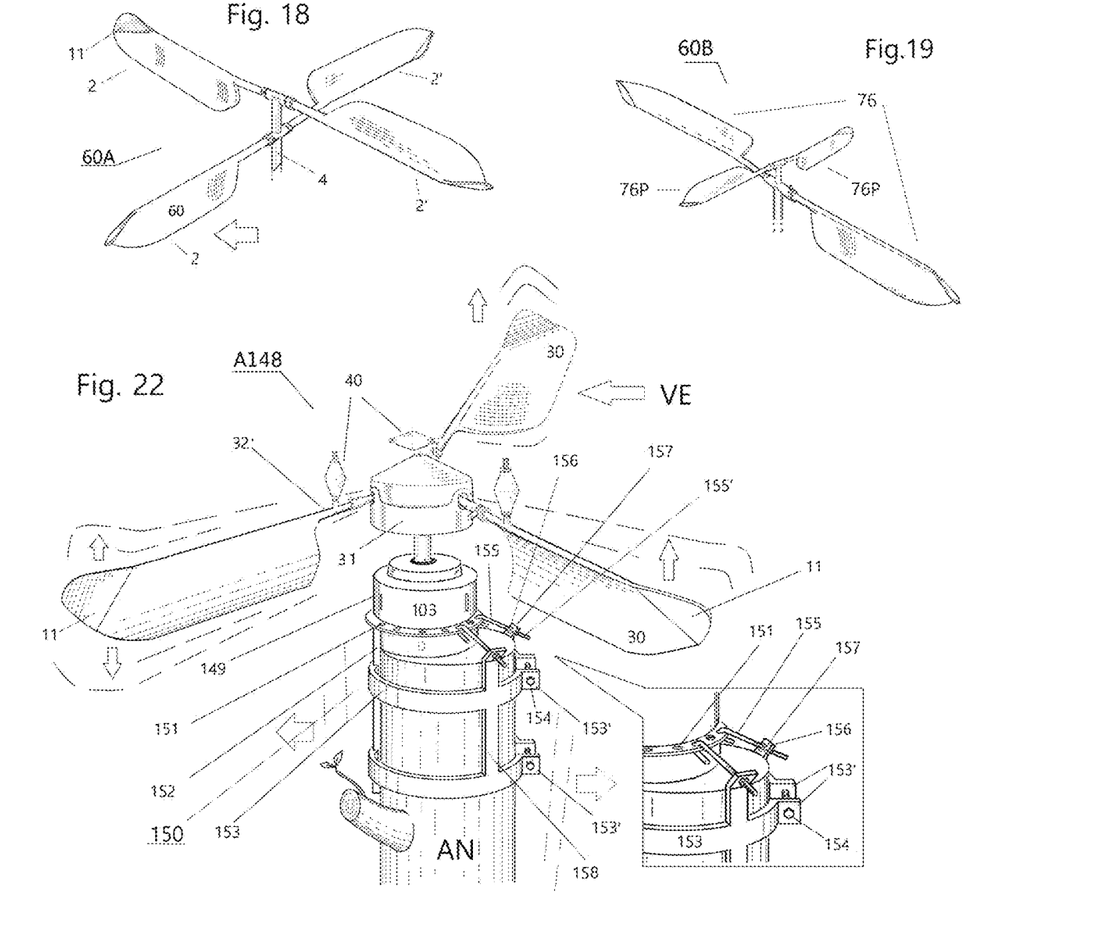
FIG. 18 is a diagrammatic, perspective view of a variant embodiment of the system in FIG. 17 in which said turbine means have a first pair of blades, having the same first dimension and axially mutually aligned in a first direction, and a second pair of blades, having the same first dimension and axially aligned in a second direction, perpendicular with respect to said first direction, are mutually superimposed.
FIG. 19 is a diagrammatic, perspective view of a variant embodiment of the system in FIG. 17 in which said turbine means have a first pair of blades, having the same first dimension and axially mutually aligned in a first direction, and a second pair of blades, having a second dimension, smaller than said first dimension, and axially aligned in a second direction, perpendicular with respect to said first direction, are mutually superimposed.
FIG. 22 is a diagrammatic and perspective illustration of an example of embodiment in which a system for generating electric energy from wind energy is installed with respect to a natural tree trunk.
Figures 20, 21:
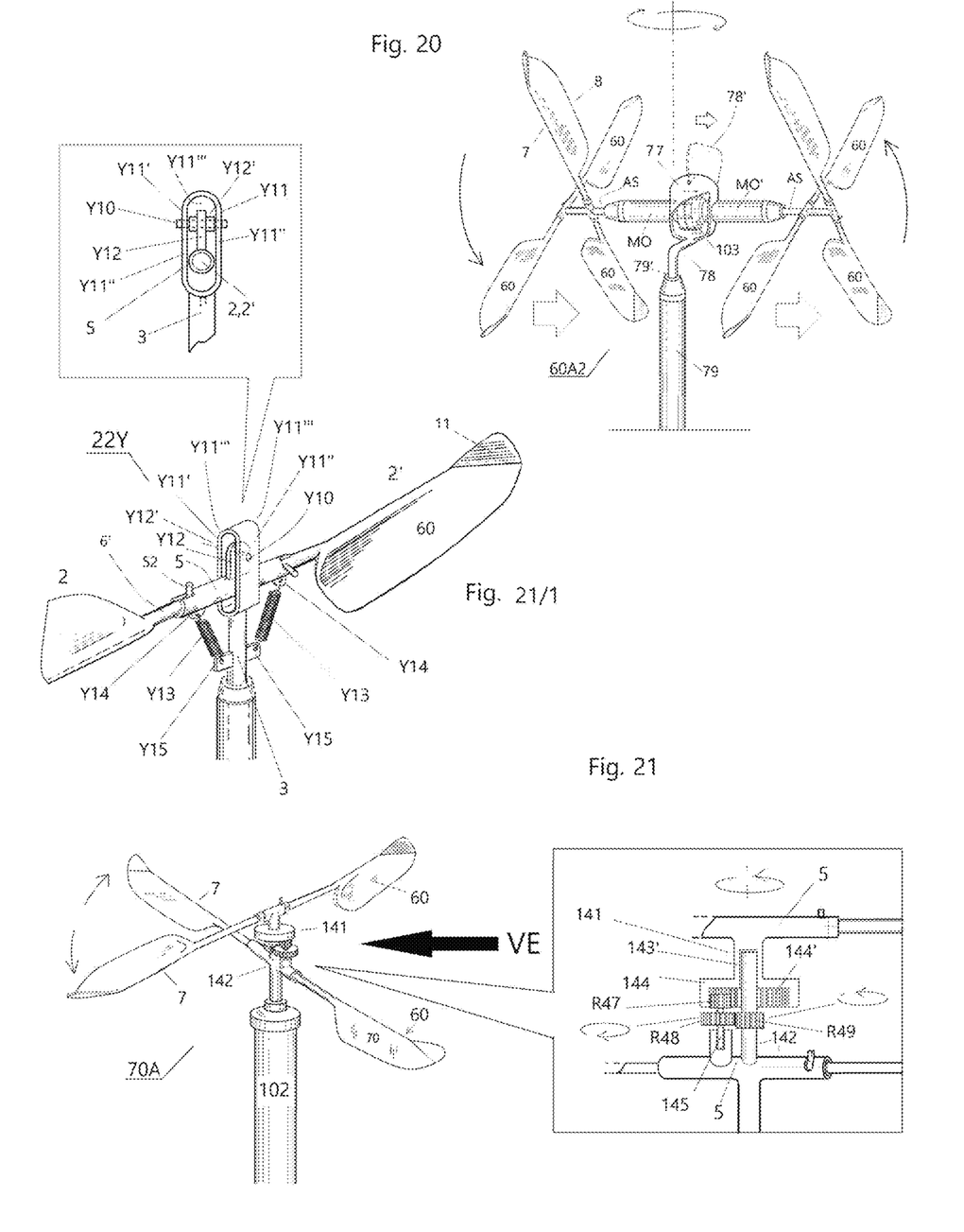
FIG. 20 is a diagrammatic, perspective illustration of a variant of the system according to FIG. 17, having a horizontal-axis turbine.
FIG. 21 is a diagrammatic, perspective illustration of a further variant of the system according to FIG. 17.

FIG. 20 shows turbine means 60A2 which have a blade arrangement similar to that in FIG. 18 (reference numeral 60A in FIG. 18), from which they differ in that they have a horizontal axis AS. In the illustrated embodiment, two arrays of blades are provided at the respective ends of a central body having two aligned segments MO, MO', each convergent with respect to the generating device 103, centrally positioned inside a special container body 77, supported by an orthogonal arm 78 (possibly with an overhanging element 78'), connected to an end portion of a supporting mast 79 (similar to the mast 120 described above).

FIG. 21 shows a further variant of the present embodiment, in which said turbine means 70A have a first array of blades with their faces oriented in a first direction, and a second array of blades with their faces oriented in a second direction, opposite to said first direction, in which said first array of blades is configured to rotate in a first direction of rotation, while said second array of blades is configured to rotate in a second direction of rotation, opposite to said first direction of rotation.

In particular, said first array of blades is connected to a first upper rotor body 141, while said second array of blades, underneath said first array of blades, is connected to a second lower rotor body 142, said rotor bodies 141, 142 being connected axially to each other in a rotating manner by means of a vertical connecting element 143.

A median conversion mechanism comprises:
a gear 144, provided in said upper body 141 and internally having a ring gear 144', and
a fulcrum 145, provided in said lower body 142, carrying a median gear provided with a gear wheel R47, configured for the engagement with said ring gear 144', as well as a further toothed wheel R48, vertically underlying with respect to the toothed wheel R47, configured for the engagement with a complementary gear R49, integral with said connecting element 143.

Figure 23:
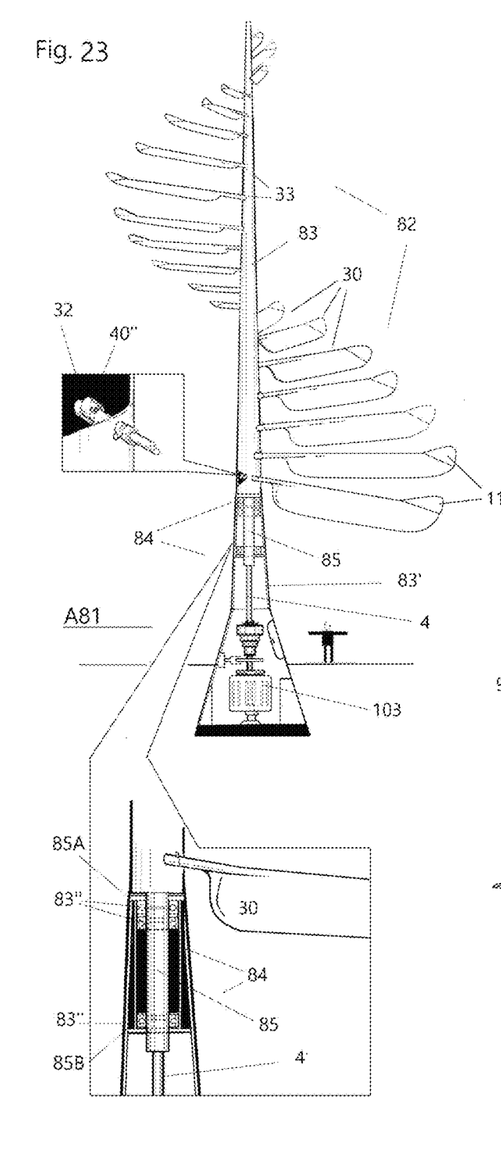
FIG. 23 is a diagrammatic, perspective view of a system for generating electric energy from wind or hydraulic energy according to a fourth example embodiment of the invention, in which turbine means have a plurality of blades, arranged about a pillar-shaped central body according to a substantially helical configuration.

FIG. 23 shows a system (in the illustrated embodiment, a spiral wind turbine A81) for generating electric energy from wind or hydraulic energy according to a fourth embodiment of the present invention, which differs from the previous ones for the arrangement of the blades.

In particular, in the present embodiment, said turbine means have a plurality of blades arranged about a pillar-shaped central body 82 in an essentially helical configuration. In the illustrated embodiment, the blades 30 have an increasing size starting from a top zone of said pillar-shaped central body 82 in the direction of the base of said pillar-shaped central body 82.

The particular configuration of the present system, which significantly reduces the overall visual impact thereof, makes it particularly favorable to be located in an urban context or in all cases close to built-up areas.

Said central body 82 is divided into an upper portion 83, adapted to turn about the axis thereof, and a lower portion 83', fixed with respect to a concrete base 202.

An intermediate portion 84 is interposed between said upper portion 83, respectively lower portion 83', and comprises an element 85 integral with respect to the lower end of said upper portion 83, which joins said lower portion 83' at one of the upper ends thereof. The upper portion 83 and the lower portion 83' of said central body 82 are mediated by specific crown bearings 83" arranged on a respective supporting and joining base 85A, internally with respect to two contact bodies 85B, so as to support said upper portion 83' rotationally with respect to said lower 83' portion.

To reduce the overall visual impact, said counterweight means are made through flat wrapping springs 40''', arranged in an end part of said proximal tubular portion 32 of the blade 30, contained within said central body 82, so as not to be visible from the outside.

A niche can be obtained for containing instrumentation or the like, where preferably the generating device 103 is also placed at the base of said slim-shaped central body 82.

Figure 24:
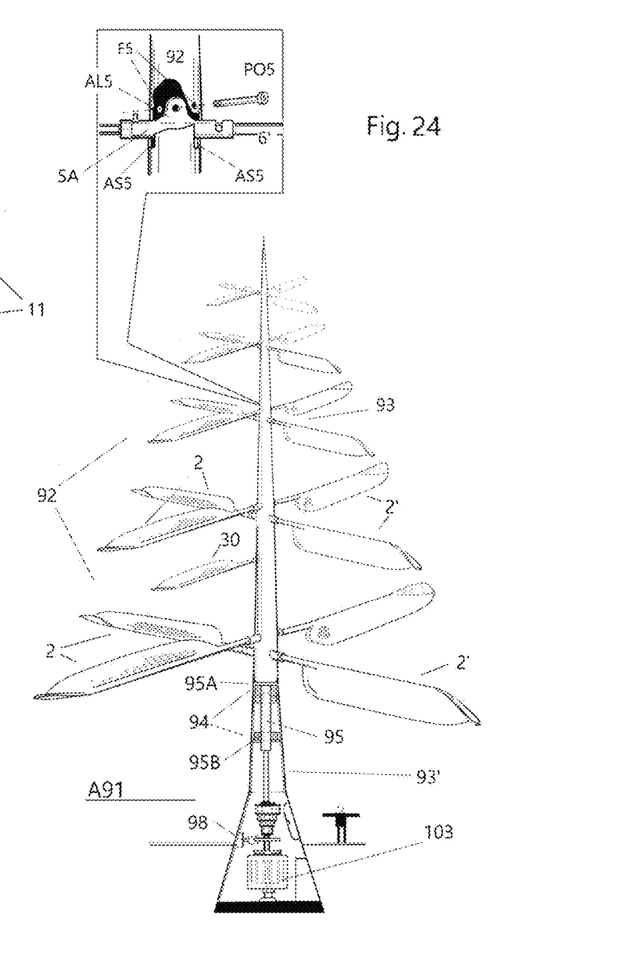
FIG. 24 is a diagrammatic, perspective illustration of a system for generating electric energy from wind or hydraulic energy according to a fifth example of embodiment of the invention, in which turbine means have different arrays of blades, in which the blades forming each array have increasing dimensions starting from a first array of blades placed close to a top zone of a pillar-shaped central body, to a last array of blades placed close to the base of the pillar-shaped central body itself.

FIG. 24 shows a system (in the illustrated embodiment, a spiral wind turbine A91) for generating electric energy from wind or hydraulic energy according to a fifth embodiment of the present invention, which differs from the previous ones for the arrangement of the blades.

In particular, in the present embodiment, said turbine means comprise various arrays of blades, where the blades forming each array have an increasing size starting from a first array of blades placed close to a top zone of a pillar-shaped central body 92 to a last array of blades placed close to the base of the pillar-shaped central body 92 itself.

Similarly to the above description with reference to the embodiment illustrated in FIG. 23, the particular configuration of the present system (e.g. substantially pine-tree-shaped) gives it a particularly pleasant appearance which makes it suitable for placement in an urban context.

Like the fourth embodiment described above, said the pillar-shaped central body 92, having a slim shape, comprises a rotating upper portion 93, and a fixed lower portion 93', as well as an intermediate portion 95, having a configuration very similar to the intermediate portion 84.

A niche 94 can be obtained for containing instrumentation or the like, where preferably the generating device 103 is also placed at the base of said central body 92.

The blades 30 forming the wind turbine A91 according to the present embodiment may be configured to perform a tilting movement with respect to the central body 92 through means very similar to those described with reference to FIG. 21/1.

According to an example of embodiment, the system (a wind turbine device A148 in this case) according to the invention can be implemented compared to a natural tree AN (FIG. 22).

In such a configuration, the turbine means 148 are positioned in relation to a top end of said shaft AN, previously cleaned, by means of a fastening device 150 configured substantially as a harness, said fastening device 150 comprising a plurality of horizontal bands 153 with perforated protrusions 153' and respective bolts 154, a plurality of first vertical structural elements 152, as well as a plurality of second vertical structural elements 158, for the reciprocal connection between said horizontal bands 153.

The generating device 103 is located below with respect to the turbine wing 148, operatively connected in transmission ratio with respect thereto, in a container body 149, connected to said fixing means 150.

Connecting means 155, e.g. configured in the form of hooks with threaded shaft 155' and clamping bolts 156 achieve the connection between coupling means 151 provided in said container body 149 and said fixing means 150, by engagement with respective perforated fins 157 having a through-hole, which project from a respective upper end of each of said first vertical structural elements 152.

Figure 25:
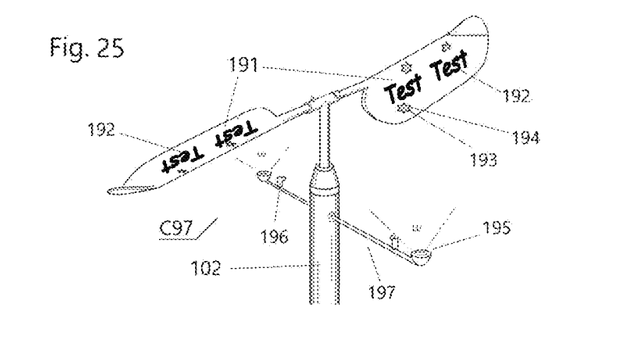
FIG. 25 is a diagrammatic, perspective, and detailed view of a variant of the system in FIG. 1, in which each blade has writing and illustrations on a respective surface.

According to the present invention (by way of example, reference is made to the wind turbine C97 illustrated in FIG. 25), the blades 2; 2' may have writing 192, illustrations 193, colors 194 or light sources on at least one respective surface (FIG. 25). Thereby, the claimed system can, in addition to its main function, also perform an ancillary function of conveying information (e.g., advertising, reporting of places, activities or events, and the like). Lights 195 or projectors 196 may also be provided, facing a surface of the blades, supported by a special support superstructure 197.

FIG. 26 shows a variant in which a wind turbine AM1, similar to the wind turbine in FIGS. 12 and 22, is installed with respect to a floating platform 300, in a marine environment. More in detail said floating platform 300 has:
- a supporting surface 301, placed at an appropriate safety distance from the surface of the water on special buoyancy tanks 302 connected to one another through beams 303 which are suited to rough seas, weight and structural stresses connected to wind and waves;
- stabilizing and anchoring means (e.g. steel cables 304) which extend between platform 300 and a suitable anchoring provided on the seabed or with respect to the mainland;
- an electrical cable 305 connecting the generating device 103 with respect to the mainland to transfer the electric energy;
- a pylon 306, centrally fixed onto said supporting surface 301 and with a transmission shaft 4 inside, operatively connected to said generating device 103.

Advantageously, said generator can be contained in a special protective container body 307.

Vertical slots 49 allow the blades 30 to perform a tilting movement, in a manner similar to that already described with reference to FIG. 12.

As shown in details A and B in FIG. 26, the blade exposed to the wind assumes an open inclination letting part of the wind flow downwards and also pushing upwards (detail A); while the blade placed in the return trajectory is arranged so as to cleave the wind in the best way (detail B).

The present system can be advantageously implemented with an electric motor-assisted positioning device as shown in FIG. 13, which allows an optimum inclination to be achieved automatically, e.g. on the basis of the detection by special means, such as an anemometer 85 or the like.

The illustrated system further comprises the positioning member 308 described above, which automatically adjusts the orientation of each blade 30 in a convenient manner in relation to the wind force.

As shown in FIG. 27/1, an adjustable positioning device Y16 is further provided comprising mutually parallel protrusions Y20 and each having a through-hole for the passage of a respective threaded pin Y22 having an abutment element Y23 at one end facing the pin 52. The distance between the ends Y24 of said abutment means Y23 determines the space of movement allowed to said pin.

In other words, by adjusting the mutual distance between said ends Y24 and the respective fixing in position by means of nuts Y25, it is possible to achieve a convenient adjustment of the blade orientation.

Figure 28:
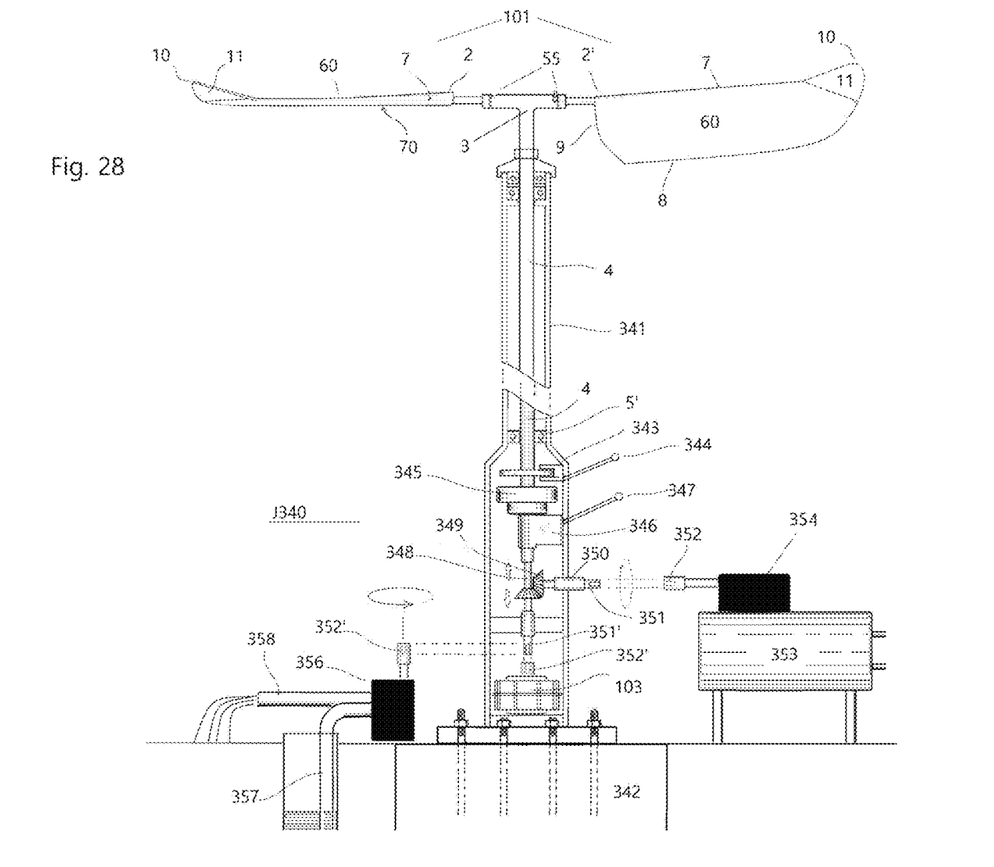
FIG. 28 diagrammatically illustrates an example of a connected system with respect to external elements with operating conditions.

FIG. 28 shows an example of a wind turbine J340 having two-bladed turbine means 101 similar to those shown in FIG. 1 fixed with respect to a vertical mast 341 connected to a base 342, in which the transmission shaft 4 extends.

As illustrated, the generator J340 further comprises:
- braking means 343 provided on said transmission shaft 4 from which a respective control lever 344 branches off;
- a multiplier 345;
- a gearbox 346 from which a corresponding control lever 347 branches off;
- a shaft 348, placed in relation to the output of said gearbox 346;
- a toothed horizontal diverter gear 349, freely rotatable in a respective hub 350;
- of the first coupling elements 351, 351', configured for coupling with respect to the complementary second coupling elements 352, 352', said second coupling elements 352, 352', being provided on an air pump 354 of compressor means 353 configured for operational connection with respect to said wind turbine J340.

The wind turbine J340 is also configured for connecting to a hydraulic pump 356 provided with a suction hose 357 and an outlet 358 for a fluid, such as water.

The generating device 103 is further provided with connecting means 352', which extend from an upper end of the generating device 103, configured for the modular engagement with connecting means 351', provided in said toothed horizontal diverter gear 349 for reconverting the turbine revolutions into electric energy. On command given by means of said control lever 347, the coupling element 352 may be lowered, thus determining the separation of said connecting means 352' of the generating device 103 with respect to said connecting means 351' of said toothed horizontal diverter gear 349.

Figure 29:
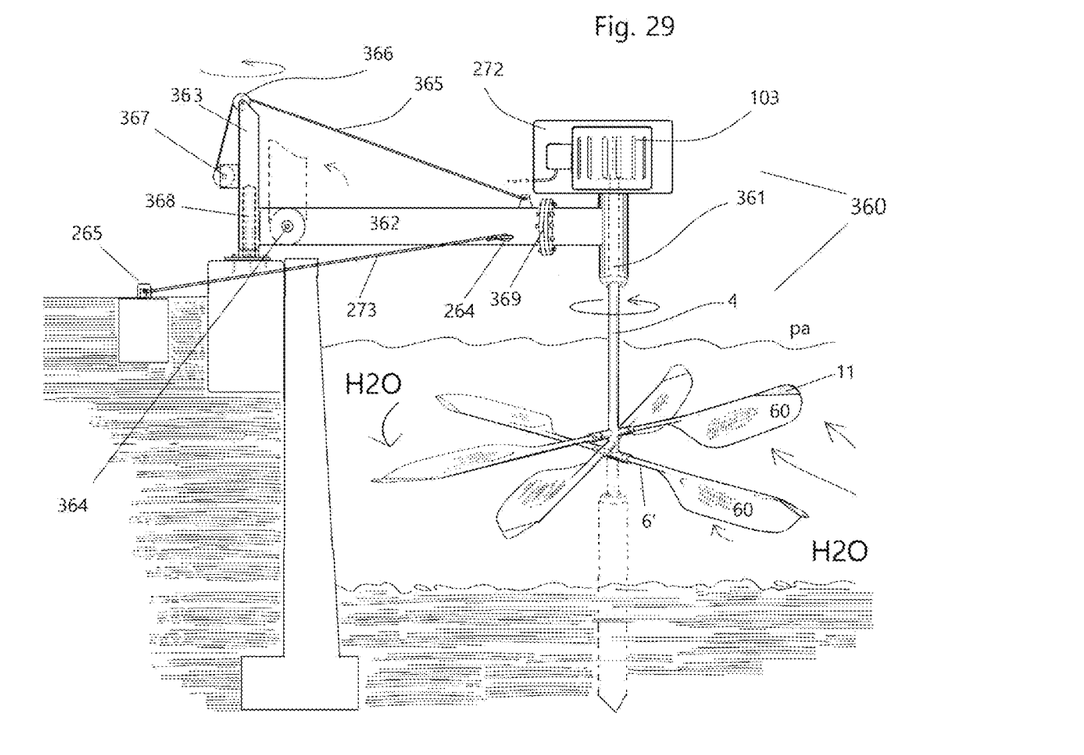
FIG. 29 diagrammatically illustrates an example of a system configured for generating electric energy from water energy.

FIG. 29 shows an example of embodiment of a hydrogenerator to be placed, e.g. in a river, provided with a turbine 360.

Unlike the wind turbines described above, the present example (i.e. a system designed to operate immersed in water) has a different turbine support system, which comprises a truss 362 connected to a support system 363 located on a riverbank AR, in which said truss 362 extends parallel to the water surface PA, slightly suspended above it. The truss 362 carries, at the free end thereof (i.e. that not engaged for the connection with respect to support 363), supporting means 361 which support, at one of the upper ends thereof, the generating device 103 and, at the lower end, the transmission shaft 4, which in turn carries the turbine blades 360 at one of the free ends thereof (i.e. that not engaged for the connection with respect to said supporting means 361).

The truss 362 and the support 363 configure a dynamic organism, in synergy with a plurality of joints, said plurality of joints including:

a lifting joint 364 supported by a traction apparatus with steel rope (or chain) 365, a pulley 366 and winding reel 367;

a lateral rotation joint 368 for approaching the bank at the rotational joint point between said truss 362 and said support 363;

A positioning joint 369 in which the beam has a detachment and connection point adjusted with two opposing plates, each one of which is attached to a beam head, and with a crown of holes concerned in a threaded coupling according to different degrees of inclination corresponding to the sliding plane of the current.

A container body 272 for the accommodation and protection of instrumentation is located at the upper end of said supporting means 361, and also conveniently encloses the generating device 103.

A crosswise supporting cable 273 extends from said truss 362 to an anchoring device 265 on the mainland, upstream of the current.

Figure 30:
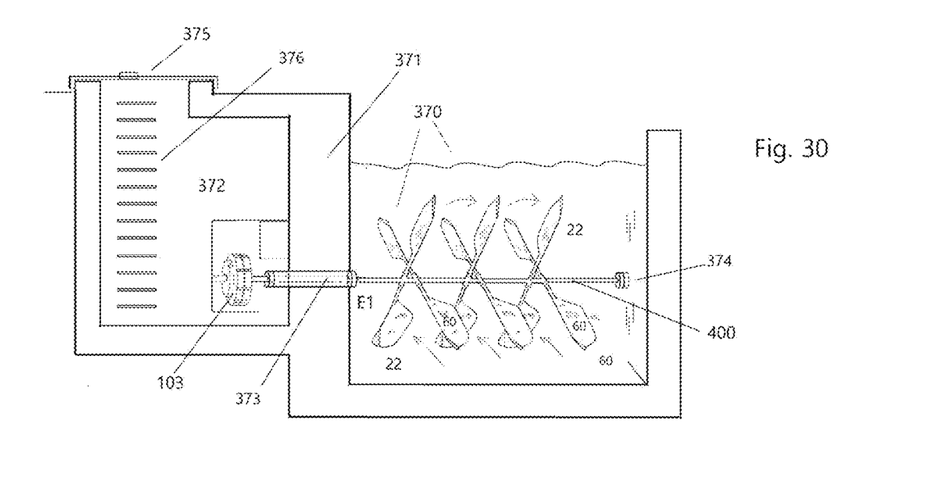
FIG. 30 diagrammatically illustrates another example of a system configured for generating electric energy from water energy.

FIG. 30 shows a further example of a hydro-generator adapted for the placement in a channeled watercourse, including horizontal axis turbine means 370 comprising a plurality of arrays of blades (three in the example), supported equally spaced apart along a tubular support 400 acting as a transmission shaft.

A bulkhead 371 separates a first room, in which there is a turbine 370, from a second room 372 in which the generator 103 is located.

A tubular body 373 passes through said bulkhead 371 and operatively connects said tubular support 400, which configures a transmission shaft, to the generating device 103.

An additional tubular body 374 connects the opposite end of said tubular support 400 (i.e. that not engaged with the tubular body 373) to an additional bulkhead, opposite to bulkhead 371.

Access to said second environment 372 (e.g. for inspection or maintenance purposes) is possible by means of a special access opening 375, from which a staircase 376 extends.

Figure 31:
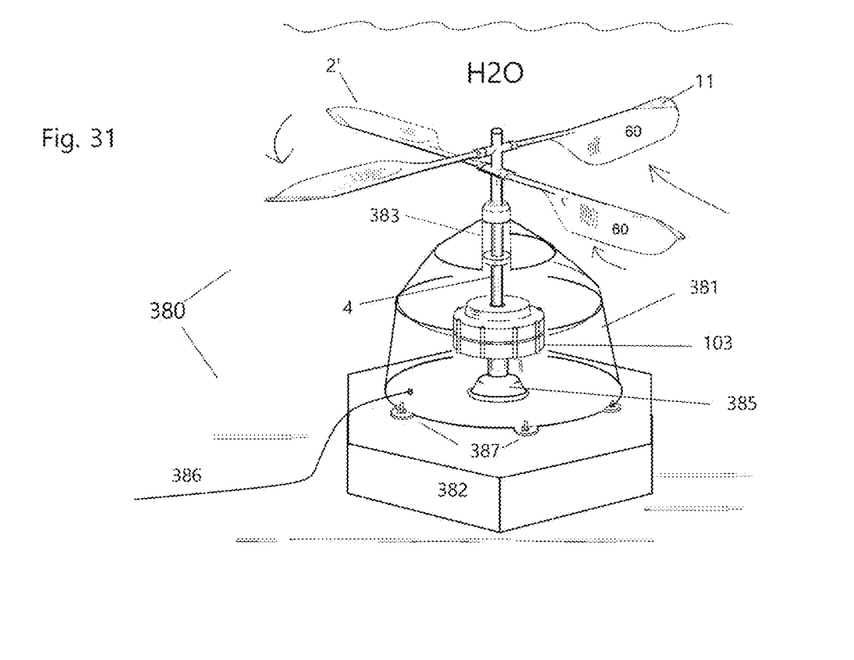
FIG. 31 diagrammatically illustrates a further example of a system configured for generating electric energy from water energy.

FIG. 31 shows a further example of an underwater hydrogenerator, comprising turbine means 380 substantially similar to the turbine means 360 in FIG. 29, but facing upwards. Said turbine means 380 are configured to cooperate in association with a watertight enclosure 381 located on a riverbed or seabed.

A support 383 is provided at the upper end of said watertight enclosure 381, and a transmission shaft 4 extends inside said support 383, exiting from the upper end thereof to support the blades of said turbine 380 at one of the upper ends thereof in situ. The other end, lower in situ, of said transmission shaft 4 is connected to said generating device 103, thus creating an operational connection between said turbine means 380 and said generating device 103.

The generating device 103 is advantageously contained in a rotating base 385. An electrical cable 386 provides for the transfer of electric energy from a watertight enclosure 381 to a receiving entity located on the mainland.

Said watertight enclosure 381 is fixed to a base 382 (e.g. made of concrete) by means of special connecting means 387.

The present invention is not limited to the embodiments described above with reference to the accompanying drawings. Any modifications or combinations of the aforesaid embodiments also fall within the scope of this invention.

As can be seen from the above, the present invention allows achieving the objects set out in the introduction in a simple and advantageous manner.

The invention claimed is:

1. A system for generating electric energy from wind or hydraulic energy, said system including:
    wind or hydraulic turbine means (A03; A04; 22Y; 101; 120; 30A; 30Y; 40A; 50A; 60A; 60B; 60A2; 70A; A81, A91; 31B; 360; 370; 380);
    an electric energy generating device (103), operatively connected to said turbine means (A03; A04; 22Y; 101; 120; 30A; 30Y; 40A; 50A; 60A; 60B; 60A2; 70A; A81, A91; 31B; 360; 370; 380) for transforming wind or hydraulic energy into electric energy,
    wherein said turbine means (A03; A04; 22Y; 101; 120; 30A; 30Y; 40A; 50A; 60A; 60B; 60A2; 70A; A81, A91; 31B; 360; 370; 380) are rotatably mounted with respect to said generating device (103), through a rotation shaft (3, 4), about a first axis (B-B) of said generating device (103),
    wherein said turbine means (A03; A04; 22Y; 101; 120; 30A; 30Y; 40A; 50A; 60A; 60B; 60A2; 70A; A81, A91; 31B; 360; 370; 380) comprise at least one blade (2, 2'; 30), configured to perform a first rotary movement with respect to said first axis (B-B), and a second rotary movement with respect to a second axis (A-A), coinciding with the axis of the blade (2, 2'; 30) itself,
    wherein said second rotary movement cooperates, in a first hemicycle of rotation of said turbine means (A03; A04; 22Y; 101; 120; 30A; 30Y; 40A; 50A; 60A; 60B; 60A2; 70A; A81, A91; 31B; 360; 370; 380) with respect to said generating device (103), upon the achievement of a first orientation position of the blade (2, 2'; 30) in which the blade (2, 2'; 30) is oriented with the blade's face (60) so as to oppose an air or water flow (VU) determining the rotation of said turbine means (A03; A04; 22Y; 101; 120; 30A; 30Y; 40A; 50A; 60A; 60B; 60A2; 70A; A81, A91; 31B; 360; 370; 380) with respect to said generating device (103), so as to offer a maximum exposure surface with respect to the flow (VU) and to optimize the rotary thrust, respectively, upon the achievement of a second orientation position of the blade (2, 2'; 30), in a second hemicycle of rotation of said turbine means (A03; A04; 22Y; 101; 120; 30A; 30Y; 40A; 50A; 60A; 60B; 60A2; 70A; A81, A91; 31B; 360; 370; 380) with respect to said generating device (103), wherein an upper edge (7) of said blade (2, 2'; 30), configured to cleave an air or water flow, is oriented opposite to a reverse air or water return flow (VC), so as to minimize the surface of the blade (2, 2'); 30) exposed to said return flow (VC), wherein each blade (2, 2'; 30) comprises at least one portion (11, 11') overhangingly projecting from a distal end (10) and/or a proximal end (9) of the blade (2, 2'; 30) itself, for intercepting an air or water flow (VE) in a condition in which, at the end of each rotary hemicycle of said turbine means (A03; A04; 22Y; 101; 120; 30A; 30Y; 40A; 50A; 60A; 60B; 60A2; 70A; A81, A91; 31B; 360; 370; 380) with respect to said generating device (103), the blade (2, 2'; 30) is arranged according to an orientation parallel to said air or water flow (VU), and therefore unable to oppose said flow (VU) with the face (60) thereof, said end portion (11, 11') being configured to:

receive a thrust from the bottom upwards to determine the passage from said first orientation position of the blade (2, 2'; 30) to said second orientation position of the blade (2, 2'; 30), respectively receive a thrust from the top downwards to determine the passage from said second orientation position of the blade (2, 2'; 30) to said first orientation position of the blade (2, 2'; 30).

2. The system according to claim 1, wherein said at least one blade (2, 2'; 30) comprises a first portion (11) overhangingly projecting from said distal end (10) of the blade (2, 2'; 30), and a second portion (11') overhangingly projecting from said proximal end (9) of the blade (2, 2'; 30).

3. The system according to claim 1, wherein said projecting portion (11, 11') is pivotally connected to said distal (10), respectively proximal (9), end of the blade (2, 2'; 30) by means of hinged connecting means (12').

4. The system according to claim 3, wherein said projecting portion (11, 11') further comprises automatic adjustment means (111) for adjusting the inclination thereof with respect to said distal (10), respectively proximal (9), end of the blade (2, 2'; 30).

5. The system according to claim 1, wherein said turbine means comprise blades (30) in number equal to or greater than three, arranged equally spaced apart in a radial pattern.

6. The system according to claim 1, wherein a proximal tubular portion (6', 6", 32; 32'; 45) of said at least one blade (2, 2'; 30) is arranged in a corresponding housing of a support element (5; 33), and wherein said support element (5; 33) comprises first oscillating connecting means having a projecting portion (Y12, 37), having a through-hole (Y12') for the insertion of a pin (36; 69; Y10; PO5) according to a direction orthogonal to said first axis (B-B), and wherein a central seat (46; 31; Y11; 92), vertically projecting with respect to a upper end of said rotating shaft (3, 4) has second oscillating connecting means, configured to engage said first oscillating connecting means, said second oscillating connecting means having two walls (Y11"; 38), parallel to each other and each having a respective through-hole, aligned with respect to said through-hole of said projecting portion (Y12, 37), for the insertion of said pin (36; 69; Y10; PO5) so as to allow a tilting movement of said at least one blade (2, 2'; 30) according to an air or water flow which skims the blade, once the connection between said first, respectively second, oscillating connecting means is established through the insertion of said pin (36; 69; Y10; PO5) in said mutually aligned through-holes.

7. The system according to claim 6, wherein said turbine means comprise blades (30) in number equal to or greater than three, arranged equally spaced apart in a radial pattern, wherein said support element (33) has a tubular body having a first open end, distal in situ, for inserting a respective proximal tubular portion (32) of a blade (30), and a second closed end, proximal in situ, wherein said first oscillating connecting means comprise said projecting portion (37) projecting from the bottom of said support element (33), and wherein said second oscillating connecting means comprise said two walls (38), which extend parallel to said projecting portion (32), projecting from the bottom, of said first oscillating connecting means.

8. The system according to claim 7, wherein said central seat further has a plurality of openings (39) for the passage of a respective support element (33), and wherein said support element (33) is supported in an oscillating manner by elastic means (Y5) provided in each of said openings (39) and connected in situ to said support element (33).

9. The system according to claim 8, wherein each of said openings (39) further has threaded adjustment means (131, 131') for defining and adjusting the maximum oscillation amplitude of each blade (30).

10. The system according to claim 1, further comprising a positioning member (55, 308) for maintaining the correct positioning of the blade (2, 2'; 30) with respect to the axis thereof in said first, respectively second, orientation position, said positioning member comprising a slot (51, 51'), configured for the engagement with a pin (52, 52') projecting from said proximal tubular portion (6', 6", 32; 32'; 45) of the blade (2, 2'; 30), and which configures stop means to delimit the rotary movement of the blade (2, 2'; 30) with respect to said second axis (A-A).

11. The system according to claim 1, comprising counterweight means (71, Y1, 40, 40', 41), connected to said proximal tubular portion (6', 6". 32; 32'; 45), respectively to said upper edge (7), of the blade (2, 2'; 30), and which extend in a direction opposite to a lower edge (8) of the blade (2, 2'; 30).

12. The system according to claim 1, wherein said turbine means comprise several arrays of blades (2, 2'; 30) superimposed on each other, either aligned or staggered, according to vertically or horizontally aligned planes.

13. The system according to claim 1, wherein said turbine means comprise a plurality of blades (30) arranged about a pillar-shaped central body (82) according to an essentially helical configuration.

14. The system according to claim 13, wherein the blades (30) of said plurality of blades have an increasing size starting from a top zone of said pillar-shaped central body (82) in the direction of the base of said pillar-shaped central body (82).

\* \* \* \* \*